Figure 1:
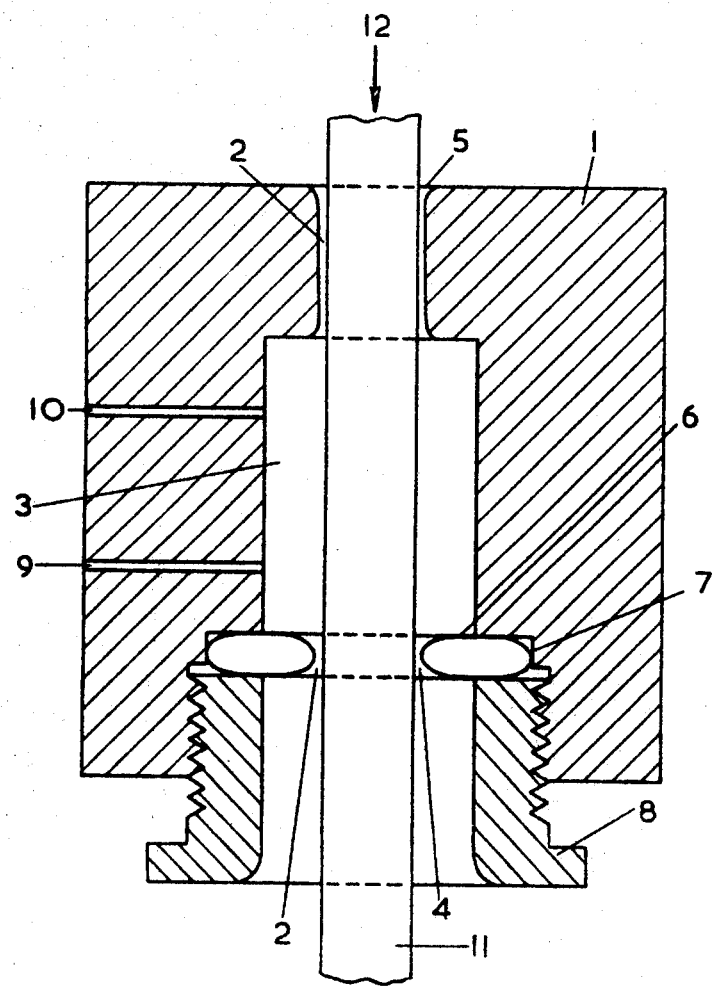

United States Patent

[11] 3,593,566

[72] Inventor Pieter Jacob Loopuyt
 Johannesburg, Republic of South Africa
[21] Appl. No. 793,140
[22] Filed Jan. 22, 1969
[45] Patented July 20, 1971
[73] Assignee African Explosives and Chemical Industries Limited
 Johannesburg, Transvall, Republic of South Africa
[32] Priority Jan. 31, 1968
[33] South Africa
[31] 68/688

[54] MEANS FOR AND METHOD OF GAUGING ARTICLES
 13 Claims, 2 Drawing Figs.
[52] U.S. Cl. .................................................. 73/37.7,
 137/81.5
[51] Int. Cl. ............................................ G01b 13/08
[50] Field of Search ........................................ 73/37.5-
 —37.9; 33/DIG. 2; 137/81.5

[56] References Cited
UNITED STATES PATENTS

| 2,402,293 | 6/1946 | Nye ............................. | 73/37.6 UX |
| 2,952,262 | 9/1960 | Pocock et al. .............. | 73/37.6 UX |
| 3,232,095 | 2/1966 | Symnoski et al. ........... | 73/37.5 |
| 3,232,096 | 2/1966 | Bruisel ....................... | 73/37.6 |
| 3,271,997 | 9/1966 | Horne et al. ................ | 73/37.7 |
| 3,285,608 | 11/1966 | Lyman ....................... | 73/37.7 X |
| 3,238,960 | 3/1966 | Hatch, Jr. .................. | 137/81.5 |

FOREIGN PATENTS

| 445,868 | 3/1968 | Switzerland ................ | 73/37.5 |

Primary Examiner—Louis R. Prince
Assistant Examiner—William A. Henry, II
Attorney—Cushman, Darby & Cushman ABSTRACT: A gauging device senses dimensional measurements of elongate articles by detecting variations in the rate of escape of a fluid from a passageway through which the elongate article passes. Fluid is admitted into a chamber in the passageway in a controlled constant supply, and a flow of the fluid is received in a fluid logic circuit to detect any changes in rate of flow. A method of sensing changes in dimensional measurements utilizes this type of gauging device.

INVENTOR
PIETER JACOB LOOPUYT

MEANS FOR AND METHOD OF GAUGING ARTICLES

This invention relates to the gauging of articles. More particularly, it relates to the gauging of articles by means of devices and apparatus employing a fluid, which may be air for example, at low pressures, including ultra low pressures.

Pneumatic gauges are well known as a means for comparing the linear dimensions of an object to be measured with a gauge block of known dimensions. These comparator gauges have been used for the measurement of, for instance, linear height, thickness or length of an object, internal or external diameter of a circular shaft or rod, degree of taper whether internally or externally of a shaft, center distance between two holes or degree of surface flatness.

The pressure of the air required to operate a pneumatic gauge such that a "read-out" of a reasonable degree of accuracy could be obtained, was of the order of 15 to 20 p.s.i.g. —a range of pressure air which is more commonly known as instrument air and which is widely used in present day chart recording instruments.

The principle of operation in pneumatic gauges depends on the effect that the proximity of the object to be gauged has upon the escape of air from a jet or jets. The jet or jets are supplied with air from the source of instrument air by means of a primary control jet or orifice. A device is interposed between the primary control jet and the gauging jet or jets to ascertain the back pressure of the air between them. The back pressure is then converted into a meaningful dimensional comparison by means of a suitable dial reading instrument, indicator or recording device.

The pressures necessary to obtain results of reasonable accuracy very often require complicated methods to convert the pressure readings into meaningful dimensional analyses. An increase in air pressure, although improving time response and accuracy of measurement, results in greater air leakage and higher operating costs. On the other hand, a reduction in the air pressure has the consequence of increasing the time lag of the response and giving a weaker signal. The complexity of the equipment required to interpret the weaker signal has been a deterrent to the general adoption in industry of pneumatic gauging equipment using pressure air in the range of 15 to 20 p.s.i.g. or thereabouts.

With the advent of low pressure and ultra low pressure "fluid logic" equipment operating on as little as 10 inches water gauge air pressure or less, the economic use of air gauging, especially in the quality control of a continuous manufacturing process, becomes not only economically feasible but desirable. For other reasons, especially in hazardous situations, the gauging of variations in cross-sectional area of a continuous product, whether extruded, drawn, spun, wound, unwound, blown or poured, etc., can be undertaken to greater accuracy than by the mechanical or pneumatic devices previously employed. Variations in cross-sectional area above a given maximum, below a given minimum or within a given range, as well as distinction between or above or below given critical limits can be ascertained, depending on the relative tolerance of the gauge, dimensions and surface smoothness of the product and the details of the fluid logic circuit to which the signal provided by the gauge is fed.

It is an object of this invention to make possible a practical application in industry of low pressure, including ultra low-pressure, fluids for measuring elongate articles and controlling their production.

Accordingly, this invention provides a gauging device for sensing changes in the dimensional measurements of, or measuring, an elongate article passing through it and containing a passage for the article, a chamber in the passage interjacent the entrance to and the exit from the passage, a first duct to admit a controlled constant supply of low pressure fluid to the chamber and a second duct to convey fluid from the chamber to be fed into a fluid logic circuit, variations in the rate of escape of fluid through the space defined by the surface of the article and the surface of the passage affecting the rate of flow of the fluid from the chamber through the second duct, such affected flow rate acting as a control signal to the fluid logic circuit.

It may be necessary to pass a continuous article through a gauging device, which is required to be installed in the production plant without disrupting operations or cutting the article. The invention, therefore, includes such a gauging device which comprises two sections split longitudinally along the axis of the passage for assembly of the device around the elongate article.

In a method according to the invention, an elongate article to be sensed in production control or to be measured is passed through a passage and a chamber interjacent the entrance to and the exit from the passage in a gauging device while admitting a controlled constant supply of low pressure fluid to the chamber through a first duct and allowing fluid to flow from the chamber through a second duct to a fluid logic circuit, changes in the dimensional measurements of the elongate article causing variations in the rate of escape of fluid from the chamber through the space between the surface of the article and the surface of the passage and such variations affecting the rate of flow of the fluid through the second duct, the affected flow rate acting as a control signal to the fluid logic circuit.

In a modification of the method, the source of the low pressure fluid may be the fluid logic circuit. Preferably, the fluid is air.

Normally, it makes no difference to the efficiency of the method whether the air escaping from the chamber via the passage for the elongate article does so at either one or both ends of that passage.

Figure 2:
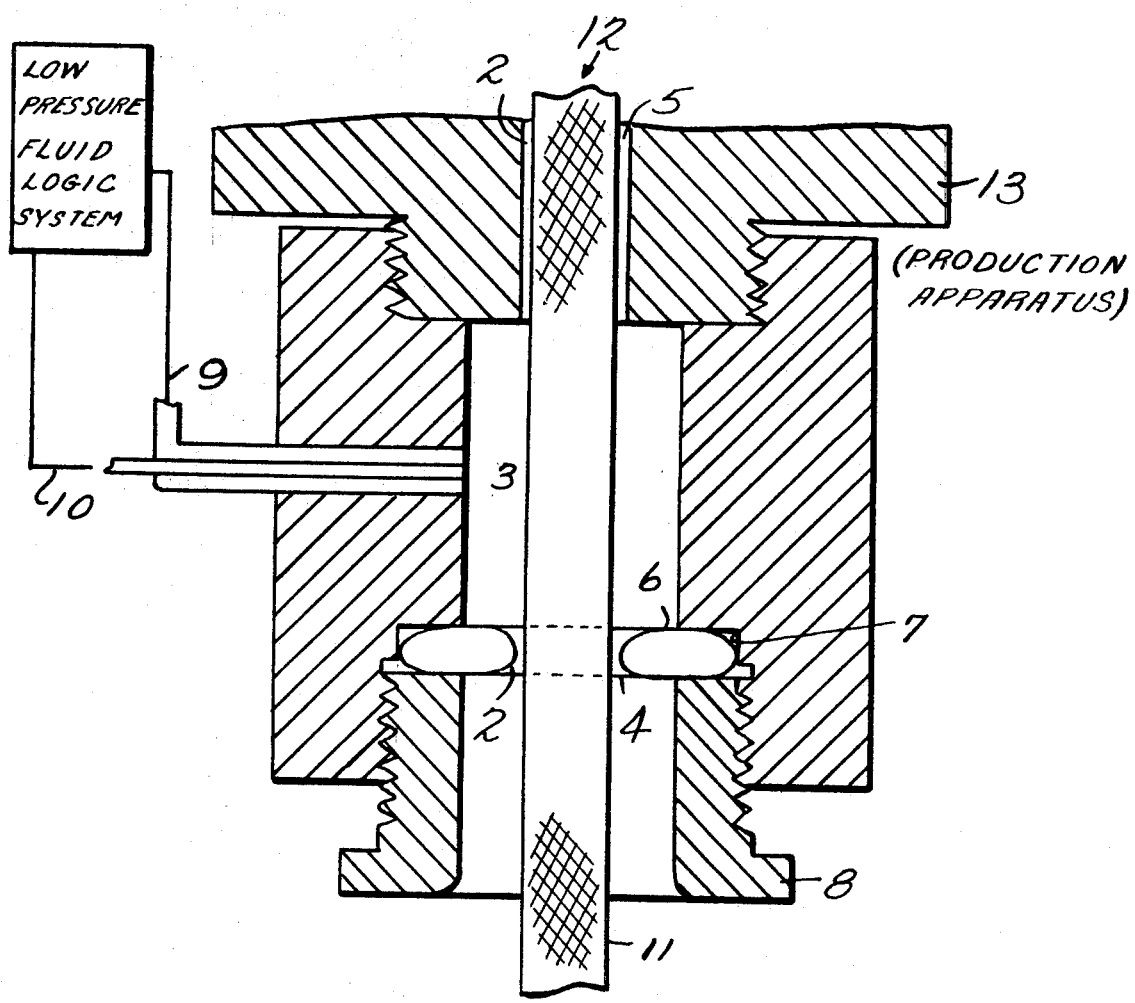

An embodiment of the invention will now be described by way of example with reference to the accompanying drawings, as briefly described below FIG. 1 illustrates a side elevation in section of one form of gauging apparatus in accordance with this invention; and FIG. 2 illustrates a side elevation in section of another form of gauging apparatus as combined with production apparatus.

The device consists of a body 1, through which is a passage 2. The passage 2 is widened into a chamber 3, which is located between the entrance to and the exit from the passage. Reference numerals 4 and 5 indicate the ends of the passage 2. Since the device is equally effective for an elongate article passing through the passage in either direction, either end 4 or end 5 may be the entrance to the passage when the opposite end will be the exit.

Entrance or exit, or both of them, may be of like or differing cross-sectional area and of rigid or flexible construction. The length of the entrance and of the exit portions of passage 2 on either side of the chamber 3 may be varied to suit the relative requirements of the elongate article being processed and the sensitivity of the gauge. Similarly, the two portions of the passage 2 may be of the same or dissimilar cross-sectional area and shape.

There may be reasons for wishing to restrict the effective bore of the passage 2 and this restriction may be achieved by controlling means mounted in or on the passage adjacent the end 4 and/or end 5.

A preferred controlling means is a ring 6 of flexible material. The ring 6 is shown seated in an annular cavity 7 and, by screwing down or unscrewing the barrel nut 8, the ring 6 is compressed or released in an axial direction to contract or enlarge the cross-sectional area of the end 4 or that length of passage 2.

Another type of preferred controlling means is a die and the die may form a passage of the apparatus producing the elongate article.

The dimensions of the chamber 3 are not critical but should be no larger than is necessary to allow free movement of fluid within the chamber and around the elongate article passing through it.

Two ducts 9 and 10 pass through the body 1 of the device to communicate with chamber 3. Conveniently, these ducts may be identical in all respects. Either one of the ducts is for the purpose of admitting a constant, controlled supply of ultra low pressure air derived from a fluid logic circuit or from another source of such air to the chamber 3 at all times during operation of the gauge. The remaining duct permits air to flow through it from the chamber 3 to the fluid logic circuit.

In a compact design of the device, the two ducts 9 and 10 may be coaxial. Either one of the ducts may be the annular duct, that is, it is immaterial which one of the coaxial ducts is the air supply duct and which one is the return flow duct. Again conveniently, the two coaxial ducts may be the same or dissimilar in length, shape or cross-sectional area.

In operation, the device will gauge and monitor the production of any elongate article such as, for instance, fiber thread, wire, rod, tube or other article of any desired cross section whether the article be of metal, metal alloy, synthetic plastics or natural material.

To illustrate further the features of this invention, the invention will be described, by way of example, in its application to the continuous manufacture of incendiary or explosive cord, known as detonating cord. Detonating cord comprises a core of granules of high velocity explosive wrapped in a paper tube, surrounded by countered layers of jute and cotton yarns and finally enclosed in a sheath of moisture proof synthetic material. Detonating cord is such a sensitive article that, for consistency and reliability in performance, tolerances should be held within strict limits.

In the gauging of the cord, where fibers are spun around the paper covered, central granular core, variations in cross-sectional area of the core above or below critical values can be monitored at the stage when the core is covered by only the first spiral winding of fibers.

The gauge was mounted on the frame of the machine (not shown) in the position previously occupied by the consolidating or press die, which was removed for this purpose. The position is located between the positions at which the application of the first spiral winding of fibers and the application of the countering spiral fibers occurs. The press die was then mounted on the gauge so that its exit coincided with the entrance to end 5 of passage 2.

The press die performs the function of compacting the paper covered granular core to the required diameter and thereby determines the dimension of the cord. Because there was no clearance between the press die and the semifinished cord emerging from it into the passage 2 of the gauge, air consumption was reduced considerably with advantage to the method employed.

In an alternative arrangement, the passage of the press die could constitute the passage 2 at end 5 of the gauge so that the passage of the press die communicates directly with chamber 3.

The cord 11 passed from the press die through the passage 2 in the direction indicated by arrow 12 while a controlled, constant supply of ultra low-pressure air flowed from the fluid logic circuit (not shown) through duct 9 into chamber 3. The difference between the cross-sectional area of the passage 2 and that of the cord 11 constituted the escape route for the air from the chamber 3. The air escaped at end 4 of passage 2.

The ambient state of pressure within the chamber 3 is a function of the cross-sectional area of the cord 11, which permits the air to escape through passage 2. This ambient state of air pressure is indicated by the rate of flow of air from chamber 3 through duct 10 to the fluid logic circuit, being either full or partial flow or no flow at all, and this rate of flow or its absence is the control signal to the circuit.

If the cross-sectional area of cord 11 were at some instant to choke substantially end 4 of passage 2, the airflow through duct 10 would immediately respond with an increase in the partial flow rate to the circuit. Full flow through duct 10 would result from a complete blockage of both ends 4 and 5 of passage 2. Conversely, if the cord 11 were to snap, leaving the chamber 3 empty, the flow rate through duct 10 would cease altogether but this cessation of flow would also be a signal to the circuit.

In the test conducted with this arrangement and a press die size of 0.125 inches in diameter, the lower critical diameter of the semicord was set at 0.121 inches. In 12 consecutive runs with the cord travelling at a minimum speed of 6 inches per second, the powder charge to the paper forming a wrapping around the core being formed was decreased to give a semicord diameter below 0.121 inches.

The gauging device responded repeatedly with a prompt signal.

In another example of the operative application of this invention to quality control, a gauging unit of the type described was tested without the flexible ring 6. The unit was secured between an upper and a lower die, each of 0.159 inches diameter, to gauge the diameter of machined steel rods. The bore of the upper die constituted part of the end passage 5 and the bore of the lower die constituted part of the end passage 4. With this arrangement the gauge consistently indicated—through a signal to the fluid logic circuit—whether the machined end of the rod was greater or less than 0.149 inches in diameter.

The fluid logic circuit can be designed to utilize the signal to record variation in section area, stop the process if predetermined parameters are exceeded or even automatically to rectify the cause of the variation. It may also convert the signal into some form of visual or audible indication or warning. Whether the output from the fluid logic circuit is of an analog or digital nature, will depend upon the design of such circuit and the requirements of the process.

The gauging device of this invention presents numerous advantages over known devices. It exhibits a far greater sensitivity and accuracy in diameter gauging—particularly where the product is in an easily deformable condition or is of a nonrigid or a spongy nature—as the gauge seldom, if ever, touches the elongate article. This is of particular advantage where surface damage would otherwise result from frictional contact with the gauge. Instances of such surfaces may be anodized aluminum and wet painted surfaces.

Whereas, in the case of a circular rod, for example, the cross-sectional area is gauged by measuring the diameter of the rod, true cross-sectional area of a wider range of cross-sectional shapes can be gauged with this device.

In hazardous atmospheres, the use of air as a gauging medium is considered to be safe, having marked advantages over electric gauges of all types.

The use of ultra low-pressure air, as now made available by the development of low pressure fluid logic equipment operating on as little as 10 inches water-gauge air pressure or less, means a reduction in operating costs allied with a low consumption of compressed air. An air blower may even suffice as a source of low-pressure air rather than conventional compressed air that has been bottled. The gauge consumes a constant controlled flow of air under pressure and, therefore, the lower the pressure is, the more economic is the operation of the equipment. This will be particularly noticeable when, as in a factory, a large number of machines could operate together in banks.

In the gauging of a continuous thread by pneumatic gauges, the time lag in obtaining a reading is of the order of seconds whereas a response from a fluid logic circuit is of the order of milliseconds. The reason for this is that the older method requires large volumes to be filed with air before a reading becomes available.

By the pneumatic procedure, the economic limit of gauged diameter was of the order of 0.1 inches (2.5 mm.). The present upper size limit by fluid logic procedure far exceeds 0.1 inches and diameters of three-sixteenth inches have been tested successfully to within 0.001 inches accuracy and better.

I claim:

1. Gauging device for sensing changes in the dimensional measurements of, or measuring, an elongate article passing through it and containing a passage for the article, a chamber in the passage interjacent the entrance to and the exit from the passage, a first duct to admit a controlled constant supply of low pressure fluid to the chamber, a fluid logic circuit, and a second duct to convey fluid from the chamber to be fed into the fluid logic circuit, variations in the rate of escape of fluid through the space defined by the surface of the article and the surface of the passage affecting the flow rate of the fluid from the chamber through the second duct, such affected flow rate acting as a control signal to the fluid logic circuit.

2. Gauging device as claimed in claim 1 in which the first duct and the second duct are coaxial, either one of the ducts being the annular duct.

3. Gauging device as claimed in claim 1 including controlling means mounted adjacent the entrance to or the exit from the passage by which the effective bore of the passage may be restricted.

4. Gauging device as claimed in claim 3 in which the controlling means is a ring of flexible material compressed in an axial direction.

5. Gauging device as claimed in claim 3 in which the controlling means is a die.

6. Gauging device as claimed in claim 1 in which the fluid is air.

7. Gauging device as claimed in claim 1 in which the elongate article is incendiary or detonating cord or fuse.

8. Gauging device as claimed in claim 1 in which the elongate article is a fiber thread, wire, rod, tube or other article of desired cross section of metal, metal alloy, synthetic plastics or natural material.

9. The gauging device of claim 1 wherein said fluid logic circuit is also the source of supply of said low-pressure fluid.

10. Method of sensing changes in the dimensional measurements of, or measuring, an elongate article comprising passing the elongate article through a passage and a chamber interjacent the entrance to and the exit from the passage in a gauging device, admitting a controlled constant supply of low-pressure fluid to the chamber through a first duct and allowing fluid to flow from the chamber through a second duct to a fluid logic circuit, changes in the dimensional measurements of the of the elongate article causing variations in the rate of escape of fluid from the chamber through the space between the surface of the article and the surface of the passage and such variations affecting the rate of flow of the fluid through the second duct, the affected flow rate acting as a control signal to the fluid logic circuit.

11. Method of sensing changes in the dimensional measurements of or measuring, an elongate article as claimed in claim 10 and including the step of supplying low pressure fluid to said chamber from said fluid logic circuit.

12. Method of sensing changes in the dimensional measurements of, or measuring, an elongate article as claimed in claims 10 in which the fluid is air.

13. Method of sensing changes in the dimensional measurements of, or measuring, an elongate article as claimed in claim 10 and including the step of actuating a warning device with the fluid logic circuit in response to the control signal.